United States Patent
Zeddies et al.

(10) Patent No.: US 7,140,856 B2
(45) Date of Patent: Nov. 28, 2006

(54) METHOD FOR PRODUCING TABLETS WITH TABLET PRESSES PROTECTED FROM THE ENVIRONMENT AND PROTECTIVE DEVICE FOR SUCH TABLET PRESSES

(75) Inventors: Helmut Zeddies, Berlin (DE); Peter Weisbach, Berlin (DE)

(73) Assignee: Korsch AG, Berlin (DE)

( * ) Notice: Subject to any disclaimer, the term of this patent is extended or adjusted under 35 U.S.C. 154(b) by 55 days.

(21) Appl. No.: 10/410,640

(22) Filed: Apr. 9, 2003

(65) Prior Publication Data

US 2003/0197299 A1    Oct. 23, 2003

(30) Foreign Application Priority Data

Apr. 18, 2002    (DE) ............................... 102 18 220

(51) Int. Cl.
*B29C 43/08*    (2006.01)
*B29C 33/70*    (2006.01)

(52) U.S. Cl. .................. 425/78; 425/151; 425/225; 425/229; 425/345; 425/DIG. 45; 425/DIG. 47

(58) Field of Classification Search .............. 425/78, 425/151, 225, 227, 229, 345, DIG. 45, DIG. 47
See application file for complete search history.

(56) References Cited

U.S. PATENT DOCUMENTS 4,140,453 A * 2/1979 John, Jr. ................. 425/151
4,654,171 A * 3/1987 Boncoeur et al. ........ 425/405.1
6,676,863 B1 * 1/2004 Christiaens et al. ........ 425/345

FOREIGN PATENT DOCUMENTS

DE         32 21 469 C2    12/1983
DE         G 91 03 247.4    6/1991

* cited by examiner

*Primary Examiner*—Yogendra N. Gupta
*Assistant Examiner*—Thu Khanh T. Nguyen
(74) *Attorney, Agent, or Firm*—Norris McLaughlin & Marcus PA

(57) ABSTRACT

The invention describes a method for producing tablets under protection from the environment with a tablet press and a protective device disposed on such tablet presses for protecting the surroundings of the presses from tablet ingredients, such as toxic substances, and/or for protecting the tablets from ambient media, such as oxygen. The object of the invention, which is to describe a method and a protective device of the aforedescribed type, which obviates the disadvantages of the state-of-the-art and ensures that the tablets can be manufactured under specific sealed conditions which guarantee that the product is protected from environmental effects and that the personnel that comes into contact with the production process is also protected, without substantially limiting access to the interior space of the press, is solved in that operational, maintenance and cleaning work is performed in the interior space (1) of the press from the outside when the press is in a sealed operating state, for which purpose of the covers of the interior space (1) of the press are provided with corresponding functional glovebox elements, such as glove openings (2), parts interlocks (3), fill and discharge openings (9, 10).

1 Claim, 2 Drawing Sheets

Figure 1:
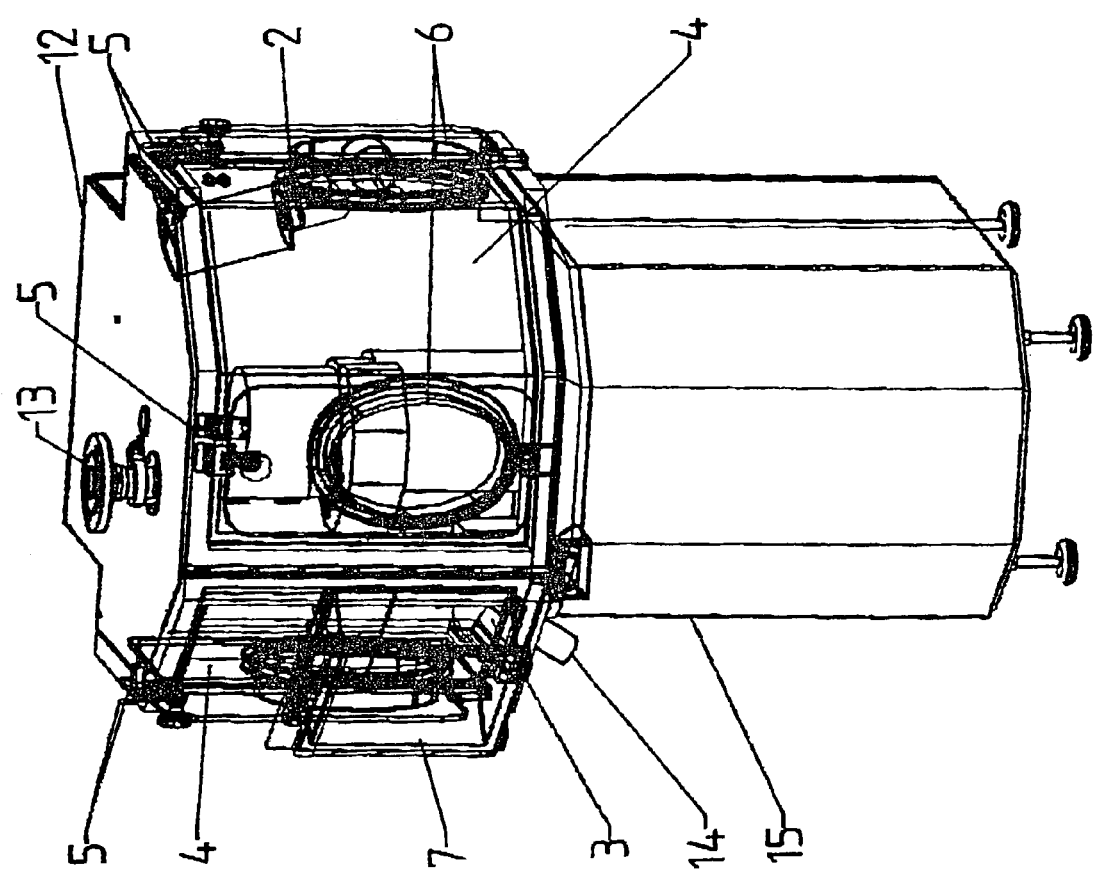

METHOD FOR PRODUCING TABLETS WITH TABLET PRESSES PROTECTED FROM THE ENVIRONMENT AND PROTECTIVE DEVICE FOR SUCH TABLET PRESSES

DESCRIPTION

The invention relates to a method for producing tablets with a tablet press protected from the environment and a protective device disposed on such tablet presses for protecting the surroundings of the press from tablet ingredients, such as toxic substances, and/or for protecting the tablets from ambient media, such as oxygen, according to the characterizing features of claims 1 in 3.

Manufacturing tablets on rotary tablet pressing machines under specific sealed process conditions protects the manufactured product from environmental effects and can therefore guarantee that the recipe is reliably maintained. On the other hand, the sealed process conditions are also intended to protect the personnel involved in the production process from toxic materials and/or in general from adverse health risks.

Protective devices in the form of a so-called "glovebox" are generally known in the art. They can be used with machines, for example, to eliminate the effect of radioactive radiation during measurements. Such a glovebox is described in DE 32 21 469 C2 for use with a process for measuring radiation of a sample.

In the manufacture of tablets, methods are known that employ protective devices to ensure a controlled overpressure in the manufacturing space for eliminating environmental effects on the product. Conversely, a controlled vacuum atmosphere can protect personnel involved in the manufacturing process. These protective devices are typically implemented as bell-shaped hoods which are placed on the pressing space.

DE G 91 03 247.4 describes the use of a sealing strip on the housing of a tablet press for preventing the pressing space of the tablet press from becoming contaminated by inflowing ambient air, while also preventing tablet dust from escaping into the installation space. Sealing strips which can completely seal the pressing space under the protective hood, are herein provided in the tiltable windows of a protective hood or in other plates of the housing, whereby the tablets are manufactured under a vacuum maintained in the pressing space. These known solutions have the disadvantage that the interior space of the press is difficult to access during operations and/or cleaning and maintenance work when the press is in its operating state, so that this work can in most situations only be performed by removing the protective device.

It is a therefore an object of the invention to describe a method and a protective device of the aforedescribed type, which obviates the disadvantages of state-of-the-art devices and ensures that the tablets can be manufactured under sealed conditions so as to guarantee that the product is safeguarded from environmental effects and that the personnel that comes in contact with the production is protected, without substantially limiting access to the interior space of the press.

This object is solved by a method according the characterizing features of claim 1 and by a protective device having the characterizing features of claim 3.

The method of the invention is characterized in that operational, maintenance and cleaning work is performed in the interior space of the press from the outside in a sealed operating state of the press, for which purpose the covers of the interior space of the press are provided with corresponding functional glovebox elements, such as glove openings, parts interlocks, fill and discharge openings.

The protective device according to the invention is characterized in that glovebox access elements, such as glove openings with covers, parts interlocks with covers and including the corresponding sealing elements and safety switches, monitoring and control elements, fill and discharge openings are integrated with the movable covers of the interior space of the press, and that a material feed is provided through a sealed flange connection extending through an upper boundary plane of the interior space of the press, and a tablet ejection mechanism with a closed transport system is provided to the outside.

The elements of the press forming the production space (interior space of the press) are configured so as to form a nearly gas-tight chamber which can be accessed for performing maintenance work or repairs, or to supply and/or withdraw components or substances, even when the press is in the operating state. This is accomplished according to the invention by providing the outer covers of the interior space of the press with access functions of gloveboxes which are known from other applications.

The operating state of the press is defined as the state in which no components of the press are moving, but where the press is in a sealed, operation-ready state under a reduced pressure or overpressure.

Advantageous embodiments of the invention are described in the dependent claims.

Figure 2:
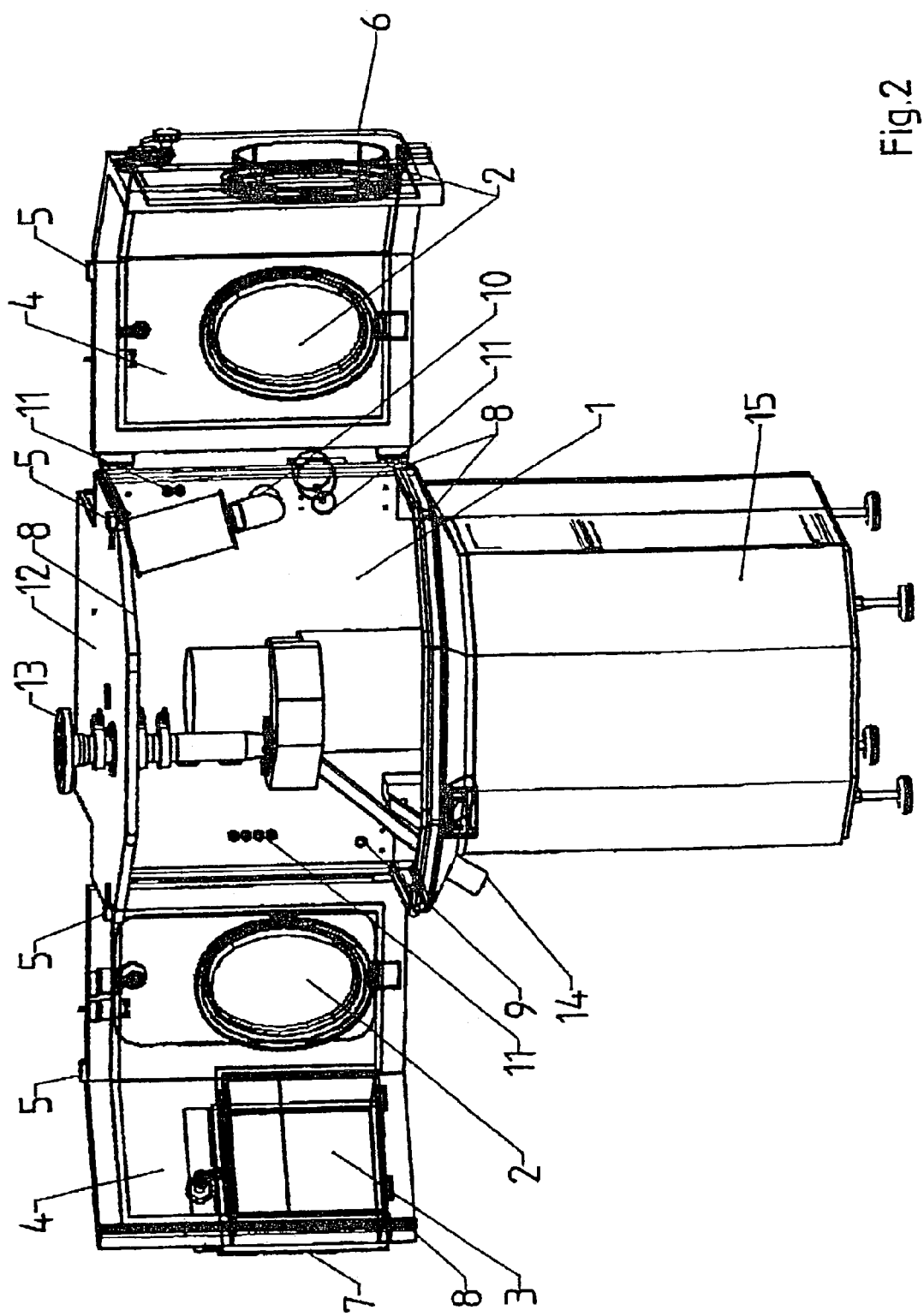

The invention will be described hereinafter with reference to an embodiment of a protective device for a tablet pressing machine (rotary tablet pressing machine). The appended drawing show in:

FIG. 1 a schematic diagram of a rotary tablet pressing machine with the essential elements of the protective device according to the invention in a closed state, and FIG. 2 a schematic diagram of the configuration of the device of FIG. 1 in an open state (front view).

As illustrated in FIGS. 1 and 2, the components forming the production space of the press are constructed so as to form a nearly gas-tight chamber, or an interior space 1 of the press with the pressing unit which is indicated only schematically.

The outer enclosure (cover) of the interior space 1 of the press is configured so as to allow visual inspection and to form a glovebox with the required access elements.

The access elements are formed by laterally arranged glove openings 2, which can be used for cleaning and maintaining the interior space 1 of the press, a parts interlock 3 (FIG. 1), which can be used to introduce and remove the press major assemblies in the operating state of the press, such as for example a filling device, tools, cleaning devices and the like.

The functionality of existing, horizontally or vertically tiltable linings 4 of the press is retained.

The required safety of the press is ensured by safety switches 5 which are disposed of the press lining 4, on covers 6 of the glove openings 2, and on a cover 7 of the parts interlock 3, and which are intended to prevent both interlock doors to be opened at the same time or access from the outside while the press is operating.

The elements forming the space are sealed by corresponding sealing elements 8 against the adjoining components of the press, thereby tightly sealing the interior space 1 of the press.

Fill openings 9 for a protective gas and/or suction openings 10 for vacuum operation (shown here with a filter) as well as control and monitoring elements 11 (FIG. 2) are disposed on the backside of the press.

The granulate and/or powder to be pressed into the tablet is fed directly to the upper boundary plane 12 of the press and introduced in a sealed manner into the interior space 1 of the press, for example, through a flange connection 13.

The produced tablets are removed from the press by an enclosed transport system, in this example a tubular system, located within the closed interior space 1 of the press via a tablet discharge 14.

A press base 15 is located underneath the interior space 1 of the press and includes conventional covers known in the art.

List of reference numerals

| List of reference numerals |
| --- |
| 1 interior space of the press with (schematically indicated) pressing unit |
| 2 glove opening |
| 3 parts interlock |
| 4 press enclosure |
| 5 safety switch |
| 6 cover |
| 7 cover |
| 8 sealing element |
| 9 fill opening |
| 10 discharge opening |
| 11 control and monitoring element |
| 12 upper boundary plane |
| 13 flange connection |

| -continued |
| --- |
| List of reference numerals |
| 14 tablet ejection |
| 15 press base |

The invention claimed is:

1. A protective device disposed on a tablet press having a nearly gas-tight interior space of the press, with the interior space of the press being formed of horizontally and/or vertically movable covers having sealing elements for protecting the surroundings of the press from tablet ingredients to be pressed and/or for protecting the tablets from ambient media, the protective device comprising glovebox access elements comprising a glove opening with a glove opening cover, a parts interlock with a parts interlock cover two parts interlock doors, the parts interlock cover being structured to prevent the doors from being opened at the same time so as to allow introduction and removal of components while in a sealed operating state; and including corresponding sealing elements and safety switches, monitoring and control elements, fill and discharge openings, all being integrated with the movable covers of the interior space of the press, a material feed being provided through a sealed flange connection extending through an upper boundary plane of the interior space of the press, and a tablet ejection mechanism with a closed transport system leading to a location outside of the interior space.

\* \* \* \* \*